(12) United States Patent
Kotagiri et al.

(10) Patent No.: US 9,987,589 B2
(45) Date of Patent: Jun. 5, 2018

(54) ROTATING PACKED BED UNIT

(71) Applicant: Hindustan Petroleum Corporation Ltd., Mumbai (IN)

(72) Inventors: Murali Kotagiri, Mumbai (IN); B K Namdeo, Mumbai (IN); Sri Ganesh Gandham, Bangalore (IN); S N Sheshachala, Bangalore (IN); Annaji Rajiv Kumar Tompala, Bangalore (IL)

(73) Assignee: Hindustan Petroleum Corporation, LTD., Mumbai (IN)

( * ) Notice: Subject to any disclaimer, the term of this patent is extended or adjusted under 35 U.S.C. 154(b) by 28 days.

(21) Appl. No.: 15/108,483

(22) PCT Filed: Dec. 30, 2014

(86) PCT No.: PCT/IB2014/002897
§ 371 (c)(1),
(2) Date: Jun. 27, 2016

(87) PCT Pub. No.: WO2015/101826
PCT Pub. Date: Jul. 9, 2015

(65) Prior Publication Data
US 2016/0317967 A1 Nov. 3, 2016

(30) Foreign Application Priority Data

Dec. 31, 2013 (IN) .................... 4147/MUM/2013

(51) Int. Cl.
*B01F 3/04* (2006.01)
*B01D 53/18* (2006.01)
(Continued)

(52) U.S. Cl.
CPC ............. *B01D 53/185* (2013.01); *B01D 3/30* (2013.01); *B01D 53/1468* (2013.01);
(Continued)

(58) Field of Classification Search
CPC .... B01F 3/04; B01F 3/04085; B01F 3/04468; B01D 3/00; B01D 3/04617; B01D 53/185; B01D 53/1468
(Continued)

(56) References Cited

U.S. PATENT DOCUMENTS 3,486,743 A 12/1969 Todd
5,363,909 A 11/1994 Acharya et al.
(Continued)

FOREIGN PATENT DOCUMENTS

EP 0020055 A1 12/1980
EP 0048088 A2 3/1982
(Continued)

OTHER PUBLICATIONS

International Search Report and Written Opinion dated Apr. 8, 2015 for corresponding PCT Application No. PCT/IB2014/002897.

*Primary Examiner* — Robert A Hopkins
(74) *Attorney, Agent, or Firm* — Kinney & Lange, P.A.

(57) ABSTRACT

A rotating packed bed (RPB) unit comprising one rotor is described. The rotor comprises a first plate and a second plate. The rotor further comprises a plurality of annular permeable packing elements housed in between the first plate and the second plate, wherein a first end of each of the plurality of annular permeable packing elements is attached to the first plate, and wherein a second end of each of the plurality of permeable packing elements is attached to the second plate. The rotor further comprises a shaft coupled to one of the first plate and the second plate for rotating the rotor. Further, the rotor comprises a liquid inlet for receiving a liquid phase and a gas inlet for receiving a gas phase.

9 Claims, 9 Drawing Sheets

(51) Int. Cl.
  *B01D 3/30*    (2006.01)
  *B01D 53/14*   (2006.01)
  *C10L 3/10*    (2006.01)
(52) U.S. Cl.
  CPC ...... *B01F 3/04085* (2013.01); *B01F 3/04468* (2013.01); *C10L 3/103* (2013.01); *B01D 2252/2041* (2013.01); *C10L 2290/541* (2013.01)
(58) Field of Classification Search
  USPC .................................... 261/83, 118; 95/149
  See application file for complete search history.

(56) References Cited

U.S. PATENT DOCUMENTS 8,702,071 B2 * 4/2014 Mello .................. B01D 53/185
                                                        261/118
2013/0319235 A1 12/2013 Wolf et al.

FOREIGN PATENT DOCUMENTS

EP      0053881 A1    6/1982
EP      0204193 A2    12/1986

* cited by examiner

ROTATING PACKED BED UNIT

TECHNICAL FIELD

The present subject matter relates, in general, to a rotating packed bed unit and, in particular, to a rotating packed bed unit having a single rotor.

BACKGROUND

Generally, conventional processing units in petroleum refining industry are huge in size. Examples of such processing units include distillation columns, absorption columns, stripping columns, and contacting columns. The main reason behind huge size of the conventional processing units is that inter-phase mass transfer rates are limited by the contact area and contact time. To overcome low mass transfer rates in the conventional processing units, rotating packed bed (RPB) units can be used. In recent times, the RPB units have received considerable attention as a means of process intensification for gas-liquid mass transfer. The RPB units can induce centrifugal forces that are over 100 to 1000 times of the gravitational force. This High Gravity driving force allows for increased throughput in the processing units, immensely improved mass transfer rates, and reduced. Height Equivalent to Theoretical Plates (HETP) by about 10 to 200 times, all of which results in size reduction of the processing units.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference the same elements.

DETAILED DESCRIPTION

The present subject matter relates to a rotating packed bed (RPB) unit. A typical RPB unit is a disk-shaped porous basket with an inlet through the center of the disk and having a circular packing element, the disk being fixed to a rotor. In operation, liquid phase is pumped into the center of the disk and driven outward radially by centrifugal acceleration. Further, gas phase is introduced at the outer surface of the disk and is forced radially inward, countercurrent to the liquid phase by pressure driving forces. The mass transfer between the two phases, i.e., liquid and gas, occurs within the disk. After that the product liquid and gas phases exit the RPB unit from their respective outlets. The RPB unit is generally packed to increase the surface area for mass transfer to occur. The circular packing element is also of sufficiently large surface area where the mass transfer occurs. The gas and liquid phases interact on said large surface area of the circular packing element.

Figure 1:
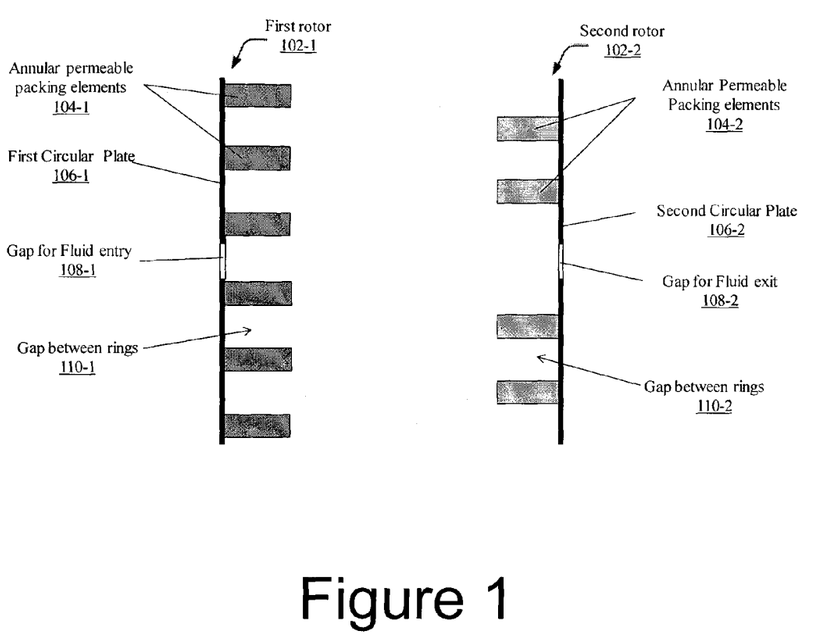
FIG. 1 illustrates a conventional two rotors design used in rotating packed bed units.

FIG. 1 illustrates a conventional two rotors design used in rotating packed bed units. The two rotors design includes a first rotor 102-1 and a second rotor 102-2. The first rotor 102-1 includes a first set of annular permeable packing elements 104-1. Similarly, the second rotor 102-2 includes a second set of annular permeable packing elements 104-2. These first and second sets of annular permeable packing elements 104-1, 104-2 are fixed to a first circular plate 106-1 of the first rotor 102-1 and a second circular plate 106-2 of the second rotor 102-2, respectively. Further, the first circular plate 106-1 includes a gap for fluid entry 108-1, whereas the second circular plate 106-2 includes a gap for fluid exit 108-2. The first and second sets of annular permeable packing elements 104-1, 104-2 are in the form of concentric hollow cylinders/rings with a gap 110-1 and 110-2 between the annular permeable packing elements 104-1 and 104-2, respectively.

Figure 2:
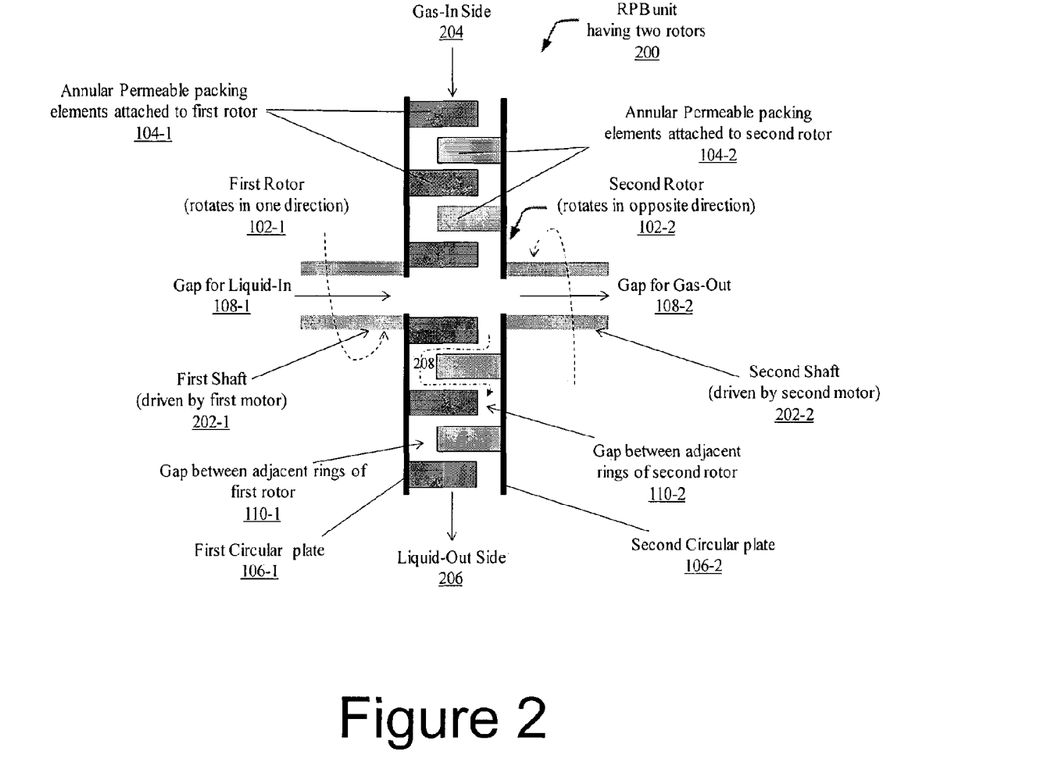
FIG. 2 illustrates a conventional rotating packed bed unit having two rotors design.

FIG. 2 illustrates a conventional rotating packed bed unit 200, the RPB unit 200 hereinafter, having the first rotor 102-1 and the second rotor 102-2, i.e., two rotors design. In the RPB unit 200, the first rotor 102-1 and the second rotor 102-2 are aligned with each other such that the first circular plate 106-1 of the first rotor 102-1 and the second circular plate 106-2 of the second rotor 102-2 are parallel to each other, and the annular permeable packing elements 104-1 of the first rotor 102-1 are placed inside the gap 110-2 between the annular permeable packing elements 104-2 of the second rotor 102-2. Similarly, the annular permeable packing elements 104-2 of the second rotor 102-2 are placed inside the gap 110-1 between the annular permeable packing elements 104-1 of the first rotor 102-1.

In addition to the first rotor 102-1 and the second rotor 102-2, the RPB unit 200 also includes a first shaft 202-1 and a second shaft 202-2. The first shaft 202-1 is connected to the gap for fluid entry 108-1 provided in the first circular plate 106-1 of the first rotor 102-1, whereas the second shaft 202-2 is connected to the gap for fluid exit 108-2 provided in the second circular plate 106-2 of the second rotor 102-2. Further, the first shaft 202-1 is coupled to a first motor (not shown) that rotates the first shaft 202-1 and hence the first rotor 102-1 in one direction. Similarly, the second shaft 202-2 is coupled to a second motor (not shown) that rotates the second shaft 202-2 and hence the second rotor 102-2 in either an opposite or same direction in relation to the direction of rotation of the first rotor 102-1.

For mass transfer operation, gas and liquid phases are fed in the RPB unit 200. The liquid phase is pumped through the first shaft 202-1 and the gap 108-1, whereas the gas phase is introduced through an outer most packing element at gas-in side 204 and is forced radially inward, countercurrent to liquid phase under pressure. The first and the second motors rotate the first rotor 102-1 and the second rotor 102-2, respectively, in either co-direction or counter-direction. Due to centrifugal forces, contact and therefore mass transfer takes place between the gas and liquid phases. After the mass transfer, the product gas phase goes out from the gap 108-2 and the second shaft 202-2, whereas the product liquid phase goes out through an outer most packing element at the liquid-out side 206 which is at the opposite side of the gas-in side 204.

In such a design of a RPB unit 200, the annular permeable packing elements can get significantly deflected during operation due to the high centrifugal forces and can lead to structural damages. The deflection that may be caused can be estimated empirically using various studies, such as Finite Element Method (FEM) studies, deflection analysis, and rotor dynamics studies, conducted on the conventional RPB units, such the RPB unit 200. These studies can include rotor modeling and FEM calculations, mechanical strength calculations of the rotor, critical speed calculations, and rotor balancing analysis. It is gathered from these studies that the conventional two rotors design has a constraint in the form of deflection of the annular permeable packing elements 104-1, 104-2. More specifically, the annular permeable packing elements 104-1, 104-2, during rotation at high speeds, such as 500 to 5000 rpm, are subjected to very high centrifugal forces causing significant deflections at the free-end peripheries of the annular permeable packing elements 104-1, 104-2. At such high centrifugal forces, any minor unbalance in the annular permeable packing elements 104-1, 104-2 may lead to the failure of the RPB unit 200 during its operation due to crashing of two sets of annular permeable packing elements 104-1, 104-2, and thus the non-performance of the subject process for improving mass transfer. In certain cases, the mechanical stresses generated in the first and second rotors 102-1, 102-2 can be more than the ultimate tensile strength of the rotor material and can lead to structural failure.

The present subject matter describes a RPB unit having RPB a single rotor in form of a ring nest assembly, i.e., having a plurality of concentric annular permeable packing elements attached to a plate on either sides of said rings, thus making it a sturdy rotor. The RPB unit uses high corrosion resistant packing elements which can be utilized in any type of gas-liquid systems including corrosion prone systems. Further, the RPB unit uses high thermal resistant packing elements which can be utilized for exothermic reactions. Further, the RPB unit uses packing elements with high mechanical strength which can tolerate and withstand high centrifugal forces. Further, the RPB unit uses wear resistant packing elements which can be packed in plurality without any damage due to wear and frictional forces. In one example, materials like Stainless Steel, Nickel, Nichrome, Iron, Silicon Carbide, Aluminum, Carbon, or their combinations based metal foams, wire mesh, structured packings, etc., can be used for making the packing elements. Further, the RPB unit uses segmental packing elements which are joined through male and female locking arrangement to form a full circular packing element. In one implementation, there is a plurality of such circular elements arranged concentrically. Said segmental packing elements may be used for ease of fabrication and sturdiness of the packing elements in the rotor. Further, the RPB unit uses annular packing elements with decreasing porosity/surface area as well as varying gaps in radially outward direction. Decreasing porosity/surface area arrangements are used for possible benefits, such as accelerated flow, controlled mass transfer. Further, the RPB unit includes such a liquid distribution system that creates tangential flow of liquid leading to similar mass transfer rates even at lower rpm. Further, the RPB unit uses circular rings with notch design for improved gas-liquid contacting leading to reduction in requirement of number of packing elements in a given system.

Since the RPB unit includes fixing of packing elements to metallic plates on both ends, therefore, any unwanted deflection of the packing elements from one end can be completely avoided. Also, the RPB unit takes care of the stresses generated in the system making it mechanically robust. Since the RPB unit uses a single ring nest assembly, therefore, the process efficiency can be achieved independent of direction of rotation. Moreover, being a single rotor design, the RPB unit requires a single motor for driving, thus reducing the power consumption of the RPB unit. Conventional RPB unit 200 includes a free path 208 between the adjacent packing elements 104-1, 104-2 of two rotors 102-1, 102-2 which may leads to unwanted channeling of gas through the free path 208 bypassing the packing elements 104-1, 104-2. This is avoided in the RPB unit as there is no such free path in the rotor design and the gas has to necessarily pass through the packing elements. Thus, improved mass transfer efficiency can be achieved.

The following detail description describes the rotating packed bed unit and its uses in detail. While aspects of the rotating packed bed can be implemented in any number of different applications, the rotating packed bed unit as per the present subject matter is described in the context of the following exemplary embodiments.

Figure 3:
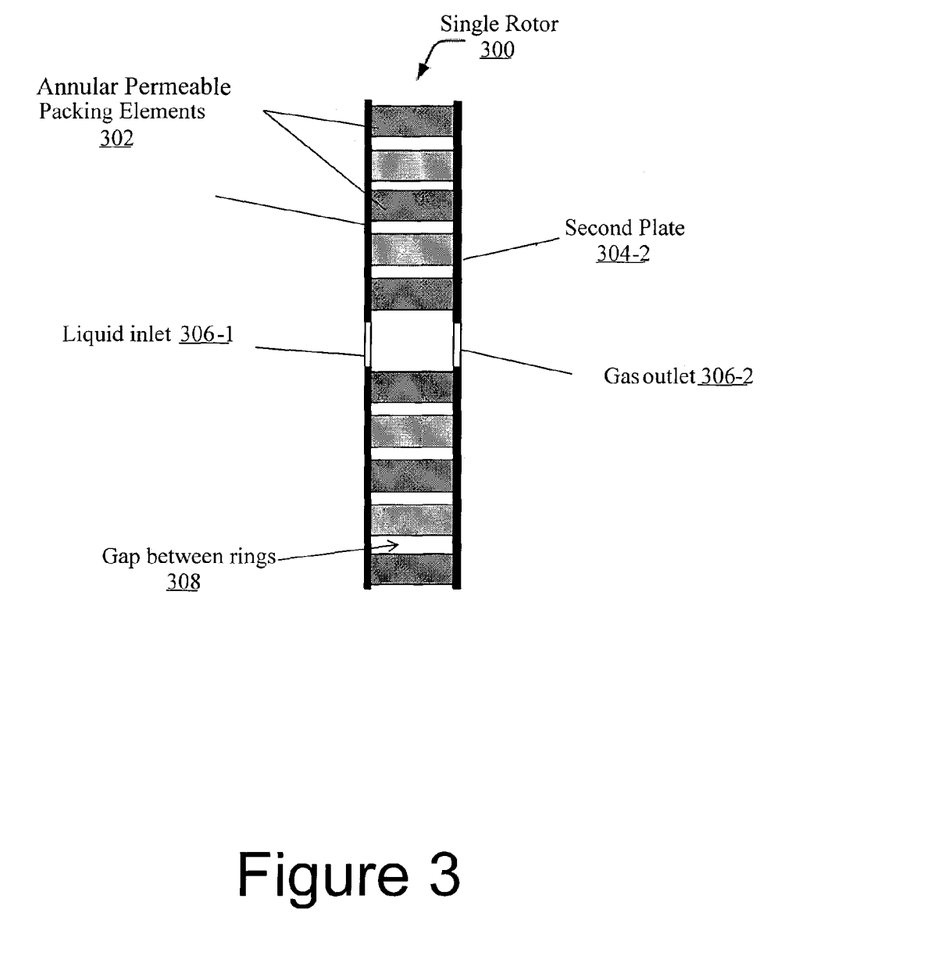
FIG. 3 illustrates single rotor design for a rotating packed bed unit, according to an embodiment of the present subject matter.

FIG. 3 illustrates single rotor design, according to an embodiment of the present subject matter. It will be understood that the single rotor may be composed of a number of components that are coupled together and work as a single unit in operation. This design includes a single rotor 300 having annular permeable packing elements 302 with one end fixed to a first plate 304-1 and second end to a second plate 304-2. The first plate 304-1 includes a liquid inlet 306-1, whereas the second plate 304-2 includes a gas outlet 306-2. The annular permeable packing elements 302 are in the form of concentric hollow cylinders/rings with a gap 308 between the adjacent packing elements. Although any packing material can be used, porous metallic or polymer foam may be preferred. In one example, woven wire screen, randomly packed pellets, foam metal, or structured packings can be used as the packing elements.

Figure 4:
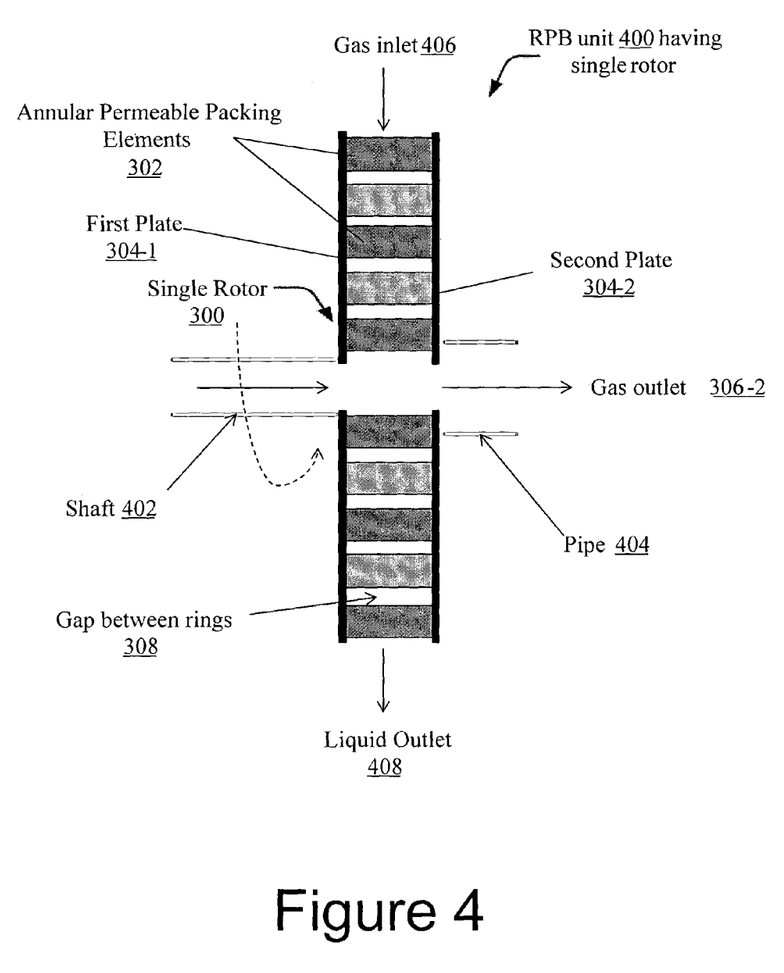
FIG. 4 illustrates a rotating packed bed unit having single rotor design, according to an embodiment of the present subject matter.

FIG. 4 illustrates a rotating packed bed (RPB) unit 400 comprises one rotor 300, according to an embodiment of the present subject matter. The RPB unit 400 includes a shaft 402 and a pipe 404. In an example, one end of shaft 402 is fixed to one of the first plate 304-1 and the second plate 304-2 of the rotor 300 at the liquid inlet 306-1. Other end of the shaft 402 is coupled to single motor (not shown) that drives the shaft 402 and hence, the rotor 300. On the other hand, the pipe 404 is stationary and is not connected to any motor. The pipe 404 serves as a channel for output gas that comes out of the gas outlet 306-2. The pipe 404 which is stationary may be connected to the rotor 300 through appropriate coupling means known in the art.

In operation, gas and liquid phases are fed in the RPB unit 400. The liquid phase is pumped through the rotating shaft 402 and the liquid inlet 306-1, whereas the gas phase is introduced through an outer most packing element at gas inlet 406 and is forced radially inward, countercurrent to liquid phase by some pressure driving forces. The single motor rotates the rotor 300 either in clockwise or anti-clockwise direction. Due to centrifugal forces, mass transfer takes place between the gas and liquid phases. After the mass transfer, the gas phase goes out from the gas outlet 306-2 and the pipe 404, and the liquid phase goes out through an outer most packing element at the liquid outlet 408 which is at the opposite side of the gas inlet 406.

In one implementation, the RPB unit 400 can be used for a fuel gas treatment/absorption process. For example, the RPB unit 400 can be used for removal of Hydrogen Sulphide ($H_2S$) from refinery Sour Fuel Gas stream, which predominantly contains of $C_1$ and $C_2$ hydrocarbons. Di-Ethanol Amine (DEA) can be used as the absorbing agent to absorb $H_2S$ from the Sour Fuel Gas. After removal of $H_2S$, the product gas, i.e., Sweet Fuel Gas can be sent to a furnace in the refinery for burning as fuel. In one example, the Di-Ethanol Amine used in the desulphurization process may include amine up to 60% by weight and rest majorly water. The feed streams to the treatment/absorption process can be: Sour Fuel Gas (having up to 20% $H_2S$ by weight) and Lean Amine (having up to 2% $H_2S$ by weight). After the treatment/absorption process, the product streams coming out would be Sweet Fuel Gas (having minimum up to 0.001% $H_2S$ by weight) and Rich Amine.

In the above implementation, the Sour Fuel Gas passes through the single rotor 300 from the outer periphery to the inner periphery. The Lean Amine enters the single rotor 300 through the hollow rotating shaft 402 connected to the single rotor 300 and travels from inner periphery to the outer periphery. During the treatment/absorption process, the Sour Fuel Gas and Lean Amine interact on the surface area of the annular permeable packing elements 302 which may have about 60% to 98% porosity. The Lean Amine absorbs the $H_2S$ from the Sour Fuel Gas and converts it into Sweet Fuel Gas. The product liquid, i.e., Rich Amine exits from the outer periphery of the single rotor 300 and the product gas, i.e., Sweet Fuel Gas exits from the centre of the Rotor through the pipe 404. In the above implementation, the RPB unit 400 may operate at a pressure ranging from Atmospheric pressure to 50 $Kg/cm^2$ g and a temperature of about 20-100° C.

Figure 5:
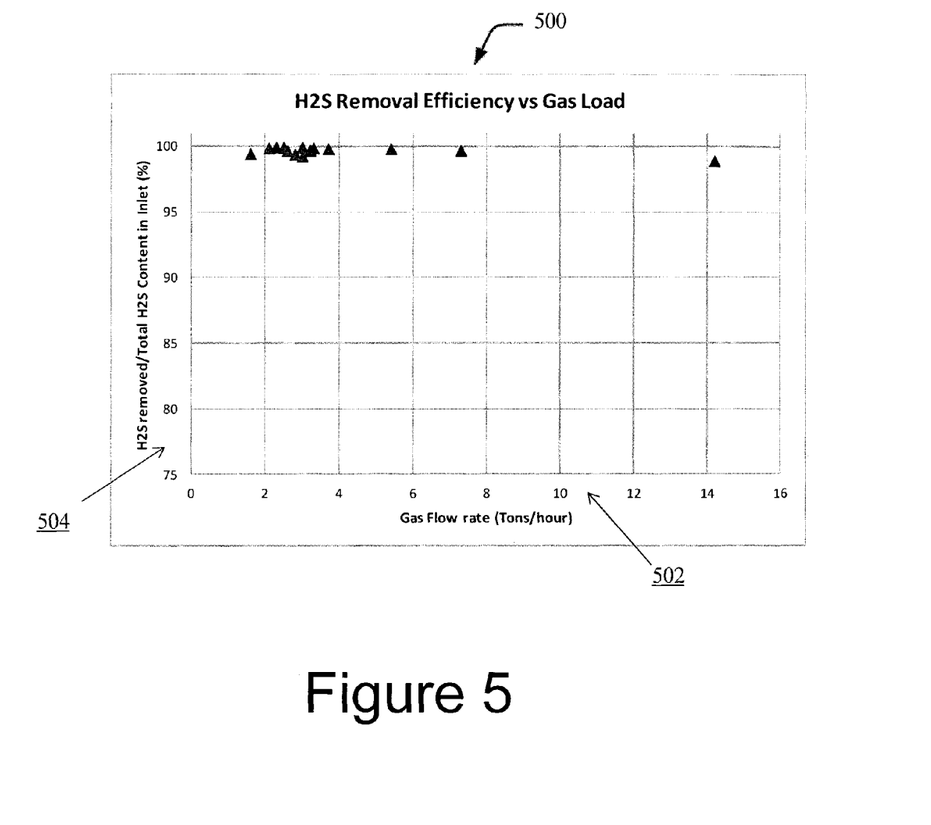
FIG. 5 illustrates a graph 500 depicting Hydrogen Sulphide ($H_2S$) removal efficiency of a rotating packed bed unit, according to an embodiment of the present subject matter.

FIG. 5 illustrates a graph 500 depicting Hydrogen Sulphide ($H_2S$) removal efficiency of the RPB unit 400, according to an embodiment of the present subject matter. As depicted in the figure, the horizontal axis 502 represents gas flow rate of the Sour Fuel Gas in tons per hour. While, the vertical axis 504 represents $H_2S$ removed per total hydrogen Sulphide content in inlet. As may be gathered, the $H_2S$ removal efficiency of Rotating packed bed is consistently above 99% for full range of Gas flow rates.

Figure 6:
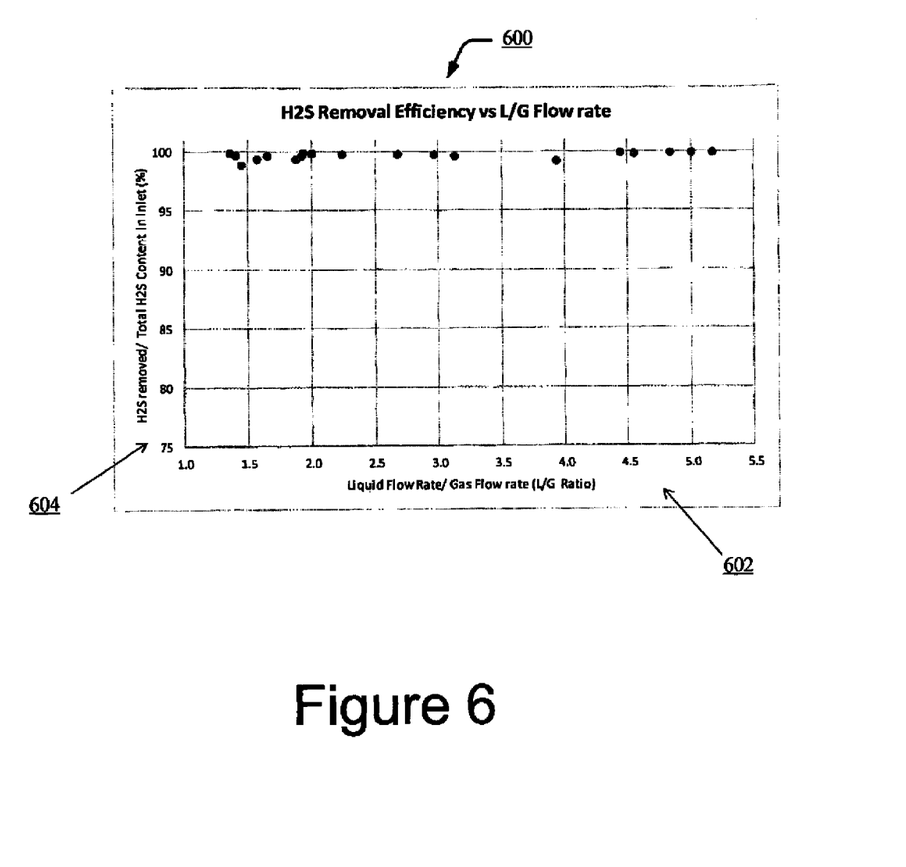
FIG. 6 illustrates a graph 600 depicting Hydrogen Sulphide ($H_2S$) removal efficiency of a rotating packed bed unit, according to an embodiment of the present subject matter.

FIG. 6 illustrates a graph 600 depicting Hydrogen Sulphide ($H_2S$) removal efficiency of the RPB unit 400, according to an embodiment of the present subject matter. As depicted in the figure, the horizontal axis 602 represents a plurality of liquid flow rate to gas flow rate ratios. While, the vertical axis 604 represents the $H_2S$ removed per total $H_2S$ content in inlet. As may be gathered, the $H_2S$ removal efficiency of Rotating packed bed has been consistently above 99% for vide range of Liquid to Gas ratios.

Figure 7:
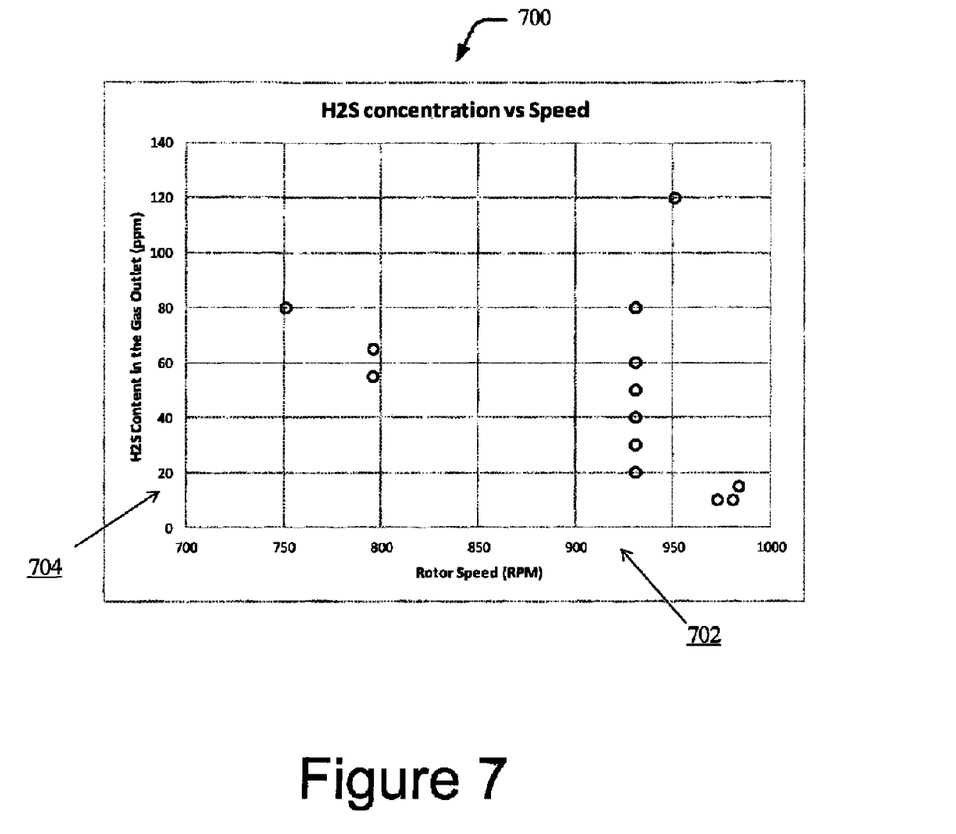
FIG. 7 illustrates a graph 700 depicting Hydrogen Sulphide ($H_2S$) content in an outlet stream of a rotating packed bed unit, according to an embodiment of the present subject matter.

FIG. 7 illustrates a graph 700 depicting Hydrogen Sulphide ($H_2S$) content in an outlet stream of the RPB unit 400, according to an embodiment of the present subject matter. As depicted in the figure, the horizontal axis 702 represents rotor speeds in rounds per minute (RPM). While, the vertical axis 704 represents $H_2S$ content in the gas outlet in ppm. As may be gathered, the $H_2S$ Content in the outlet stream is always significantly less for a given range of RPM of the Motor.

Figure 8:
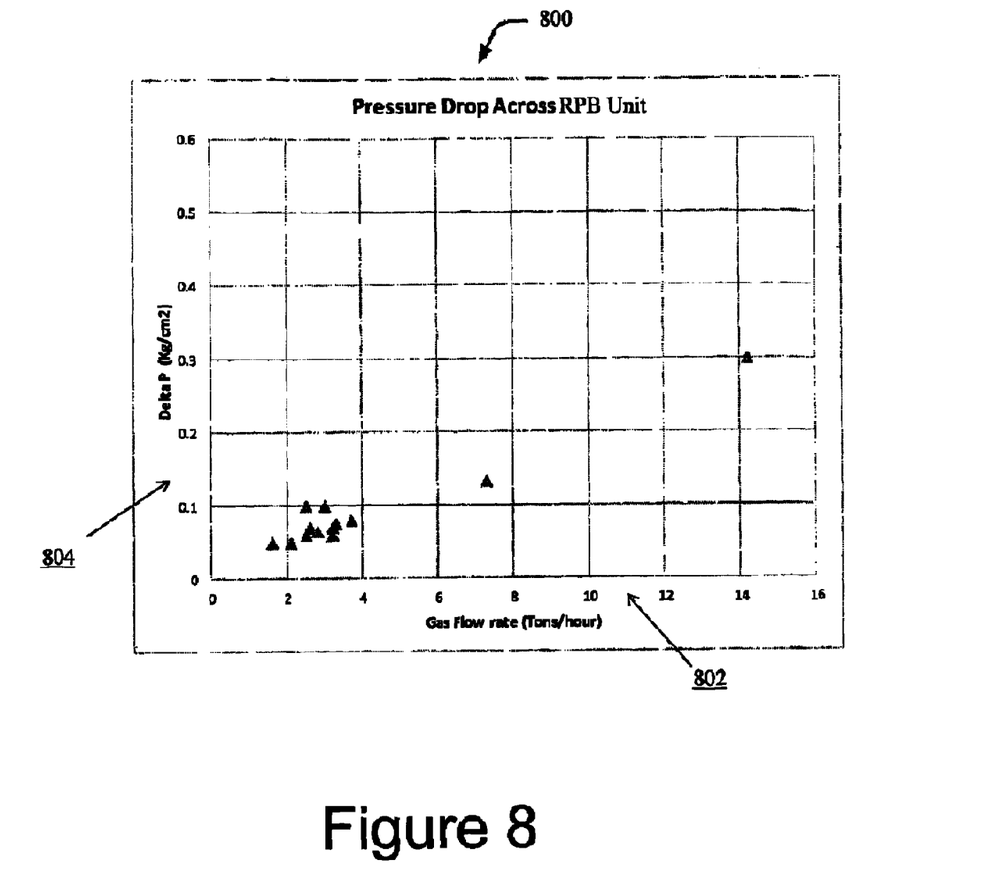
FIG. 8 illustrates a graph 800 depicting pressure drop across a rotating packed bed unit, according to an embodiment of the present subject matter.

FIG. 8 illustrates a graph 800 depicting pressure drop across the RPB unit 400, according to an embodiment of the present subject matter. As depicted in the figure, the horizontal axis 802 represents gas flow rate in tons per hour. While, the vertical axis 804 represents change in pressure, i.e., delta p. As may be gathered, the pressure drop across the Rotating packed bed is less for varying Gas Loads.

Figure 9:
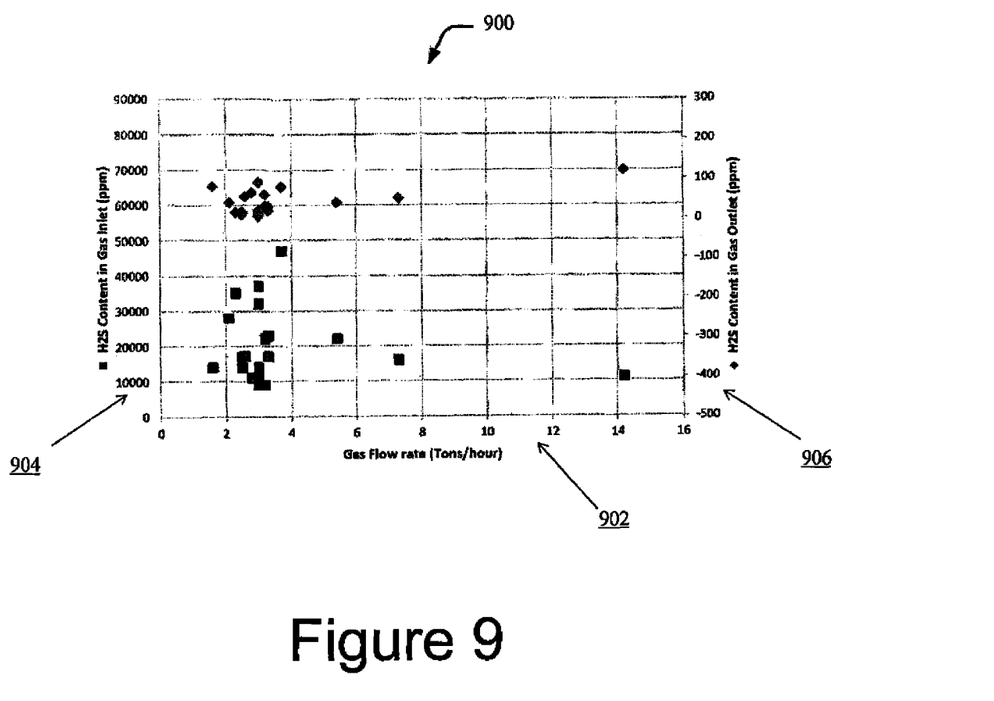
FIG. 9 illustrates a graph 900 depicting performance of a rotating packed bed unit, according to an embodiment of the present subject matter.

FIG. 9 illustrates a graph 900 depicting performance of the RPB unit 400, according to an embodiment of the present subject matter. As depicted in the figure, the horizontal axis 902 represents gas flow rate in tons per hour. While, the vertical axis 904 represents Hydrogen Sulphide ($H_2S$) content in gas inlet in ppm and the second vertical axis 906 represents $H_2S$ content in gas outlet in ppm. In the figure, the square dots represents inlet $H_2S$ Concentration and their value varies as we move along the vertical axis 904. While, the diamond shaped dots depict outlet $H_2S$ concentration and their value varies as we move along the second vertical axis 906. It can be observed, that for all inlet values, $H_2S$ in product stream was consistently less.

Validation and Results

The following details have been provided for the purpose of validation of the efficiency of the present subject matter describing the RPB unit 400. In a demonstration unit comprising the RPB unit 400, a design of the RPB unit 400 is in line with the original design of Fuel Gas Amine Absorption Unit with Di-ethanol amine as absorption media. The RPB unit 400 is designed to handle the flow rates illustrated below in Table 1.

TABLE 1

| Sr. No. | Parameter | Flow Rate | Unit |
|---|---|---|---|
| 1 | Sour Fuel Gases to the RPB unit 400 | 15500 | Kg/hr |
| 2 | Sweet Fuel Gases from the RPB unit 400 | 14500 | Kg/hr |
| 3 | Lean Amine to the RPB unit 400 | 32000 | Kg/hr |
| 4 | Rich Amine from the RPB unit 400 | 33000 | Kg/hr |

The RPB unit 400 is designed for a maximum of 15500 kg/hr of sour fuel gas which can be a mixture of various gases coming from the upstream units in the refinery. The RPB unit 400 is further designed for a stream factor of 8000 hours/annum and the unit is capable of a turndown of about 20%. In the demonstration unit, Sour Fuel gases from different units constituted the feed to the RPB unit 400. Further, 25 wt. % Di-ethanolamine as aqueous solution with $H_2S$ loading not exceeding 0.03 mole $H_2S$/mole Di-ethanolamine was used as the absorbent. A 'feed streams' table 2 illustrating the temperature and the pressure at which the feed were received by the RPB unit 400 is shown below:

Feed Streams

TABLE 2

| FEED | NORMAL PR. | NORMAL TEMP. | DESIGN PR. | DESIGN TEMP. |
|---|---|---|---|---|
| Fuel Gas | 4.9 | 40 | 7.0 | 65 |
| Lean Amine | 8.5 | 46 | 16.5 | 107 |

Additionally, the RPB unit 400 is designed for sweet fuel gas with 120 ppm wt. $H_2S$. In the setup, Rich Amine Solution having max. $H_2S$ loading of 0.36 moles per mole was taken.

In the demonstration unit, outgoing streams were delivered as per the conditions illustrated in 'product streams' table and 'design feed and product $H_2S$ content table' illustrated below:

Product Streams

TABLE 3

| Sr. No | Stream | Design Conditions | |
|---|---|---|---|
| | | Pressure (kg/cm$^2$g) | Temp. ° C. |
| 1 | Sweet Fuel Gas | 6.4 | 75 |
| 2 | Rich Amine | 7.0 | 75 |

Design Feed and Product $H_2S$ Content

TABLE 4

| Stream | $H_2S$ Content (wt. %) |
|---|---|
| Sour Gas | 4.71 |
| Sweet Gas | 0.012 |
| Lean Amine | 0.24 |
| Rich Amine | 2.44 |

Although embodiments for the rotating packed bed unit as per the present subject matter have been described in a language specific to structural features and/or applications, it is to be understood that the invention is not necessarily limited to the specific features or applications described. Rather, the specific features and applications are disclosed as exemplary embodiments.

We claim:

1. A rotating packed bed (RPB) unit comprising one rotor, the rotor comprising:
    a first plate and a second plate;
    a plurality of annular permeable packing elements housed in between the first plate and the second plate, wherein a first end of each of the plurality of annular permeable packing elements is attached to the first plate, and wherein a second end of each of the plurality of annular permeable packing elements is attached to the second plate, wherein at least one of the plurality of annular permeable packing elements comprises one or more segments, wherein the one or more segments are coupled together to form a circular ring of the annular permeable packing elements, and wherein the annular permeable packing elements are provided with decreasing porosity and varying gaps in a radially outward direction;
    a shaft coupled to one of the first plate and the second plate for rotating the rotor; and
    a liquid inlet for receiving a liquid phase and a gas inlet for receiving a gas phase.

2. The RPB unit as claimed in claim 1, wherein the rotor further comprises a pipe connected to the second plate.

3. The RPB unit as claimed in claim 1, wherein the rotor further comprises a liquid outlet and a gas outlet.

4. The RPB unit as claimed in claim 1, wherein the first plate and the second plate are circular in shape.

5. The RPB unit as claimed in claim 1, wherein the plurality of annular permeable packing elements is concentric.

6. The RPB unit as claimed in claim 5, wherein the plurality of annular permeable packing elements is arranged based on a surface area associated with each of the plurality of annular permeable packing elements.

7. The RPB unit as claimed in claim 1, wherein the first plate is positioned parallel to the second plate.

8. The RPB unit as claimed in claim 1, wherein each of the plurality of annular permeable packing elements is corrosion resistant.

9. The RPB unit as claimed in claim 1, wherein the plurality of annular permeable packing elements is made of at least one of stainless steel, nickel, nichrome, iron, silicon carbide, aluminum, carbon, and wire mesh; and wherein the annular permeable packing elements comprise of one or more structured packings.

* * * * *